United States Patent [19]

Kreutel, Jr.

[11] 4,385,378
[45] May 24, 1983

[54] HIGH POWER MULTIPLEXER FOR DUAL POLARIZED FREQUENCY REUSE EARTH STATIONS

[75] Inventor: Randall W. Kreutel, Jr., Rockville, Md.

[73] Assignee: Communication Satellite Corporation, Washington, D.C.

[21] Appl. No.: 180,723

[22] Filed: Aug. 25, 1980

[51] Int. Cl.$^3$ .......................... H04J 1/08; H04J 11/00
[52] U.S. Cl. ...................................... 370/19; 370/69.1
[58] Field of Search .................. 370/19, 20, 69.1, 123; 179/170 NC; 455/101

[56] References Cited

U.S. PATENT DOCUMENTS

| | | | |
|---|---|---|---|
| 2,825,753 | 3/1958 | Hausz | 370/69.1 |
| 3,144,647 | 8/1964 | Sichak | 455/101 |
| 4,029,902 | 6/1977 | Bell et al. | 370/123 |

OTHER PUBLICATIONS

"An Adaptive Crosspolar Cancellation System . . ." by O'Neill et al., Conference: Radio Spectrum Conservation Techniques, London, England, Jul. 7–9, 1980.

*Primary Examiner*—Douglas W. Olms
*Attorney, Agent, or Firm*—Sughrue, Mion, Zinn, Macpeak and Seas

[57] ABSTRACT

A modular arrangement of directional RF filters provides frequency multiplexing of signal sources at earth stations which are transmitting on two orthogonal polarizations. Each of the modules consist of a pair of 3 dB hybrid couplers coupled to each other through identical bandpass filters such that a signal applied to one of two input ports is output exclusively through an associated one of two output ports. The passbands of each of the modules are mutually exclusive. The output ports of each module are coupled to an output port of two adjacent modules, and two main outputs are taken from the two outer modules. The signals from the two main outputs are applied to two antennas having mutually orthogonal polarizations. The present invention may also be used as a demultiplexing receiver.

13 Claims, 1 Drawing Figure

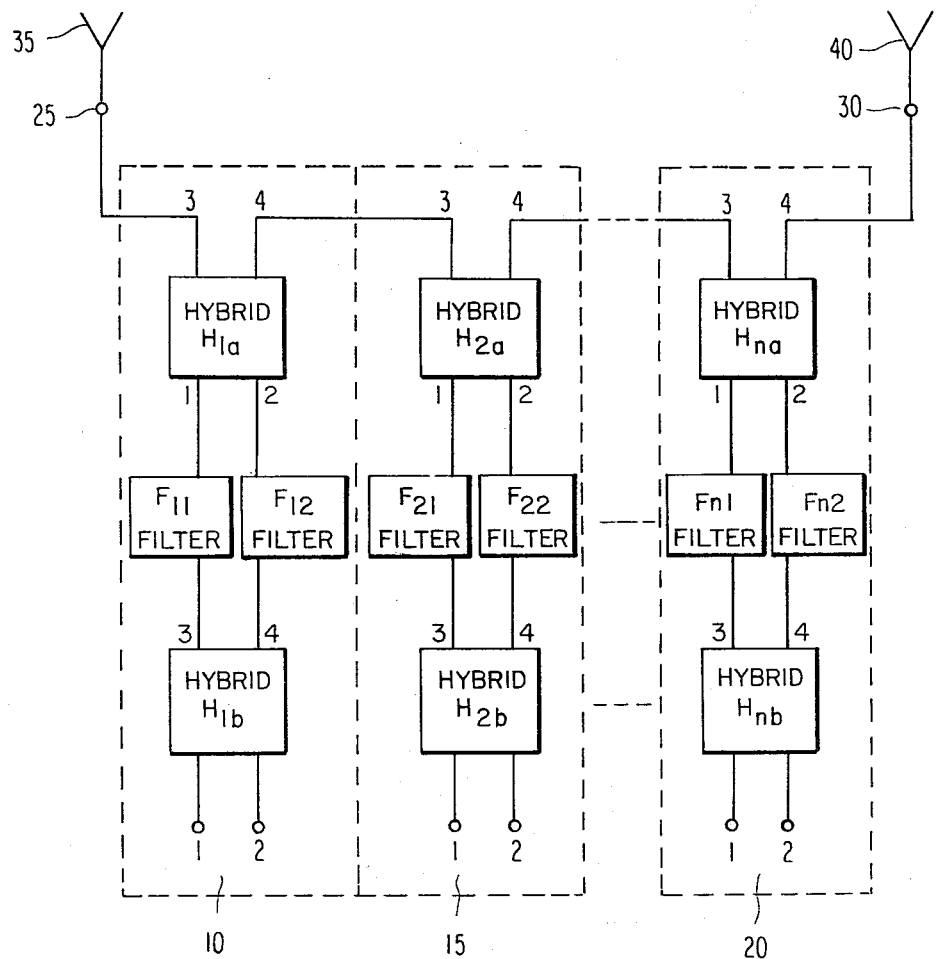

HIGH POWER MULTIPLEXER FOR DUAL POLARIZED FREQUENCY REUSE EARTH STATIONS

BACKGROUND OF THE INVENTION

The present invention is related to a modular arrangement of directional RF filters employed to provide multiplexing of a plurality of earth station transmitters which transmit on two orthogonal polarizations.

Ground stations adapted for communication with a plurality of diverse frequency satellite transponders must accommodate a wide spectrum of frequencies. Each of the satellite transponders may, for example, have a frequency band over approximately 36 MHz, with an additional guard band of 4 MHz. Thus, a ground station which must communicate with a satellite having 12 transponders, for example, must necessarily operate at least over a 480 MHz (40 MHz×12) band.

In frequency reuse systems, a doubling of the information carrying capacity of a system is achieved by separating signals having the same frequency on the basis of polarization. Thus, in the above described communication system, the earth station may communicate with a satellite transponder having 12 vertically polarized and 12 horizontally polarized transponders.

In such frequency reuse systems, the ground station transmitters in accordance with commonly used techniques are provided in one of two ways. First, a single wide-band power source covering the entire frequency spectrum may be employed for each polarization. However, such wide-band sources are expensive and inefficient when operated at the back-off required for multiple carrier transmission. Secondly, a plurality of frequency sources may each be multiplexed for the individual polarizations. This, however, requires the use of two multiplexers, one for each of the vertically and horizontally polarized transmissions.

SUMMARY OF THE INVENTION

The present invention avoids the problems associated with the above mentioned techniques by providing a modular arrangement of direction RF filters which are employed to provide the multiplexing of transmitted power sources at earth stations on two orthogonal polarizations.

The multiplexer in accordance with the present invention consists of a plurality of modules, each module consisting of a directional filter. Each of the modules contains two identical three dB hybirds coupled by two identical bandpass filters. Each of the modules has the property that a signal applied to one input port will be transmitted exclusively through an associated output port, while a signal applied to a second input port will be transmitted exclusively from the other output port. The two output ports are provided with orthogonal antennas to provide diverse polarization transmission.

The output ports of the plurality of modules are coupled in series fashion such that only two main output ports are provided for the plurality of modules. Each of the plurality of modules is tuned to a single frequency band such that signals within the frequency band are passed from module input to module output, while signals from adjacent modules having frequencies outside the pass band are reflected from module output to module output. Each of the transmission signals applied to the first input ports of the hybrids are transmitted from the associated first main output port at a first polarization, while the transmission signals applied to the second input ports of the plurality of hybrids are transmitted from the associated second output port at a second polarization orthogonal to the first.

The apparatus in accordance with the present invention may also be used as a signal demultiplexing receiver.

BRIEF DESCRIPTION OF THE DRAWING

The sole FIGURE is a block diagram of the dual polarization multiplexer in accordance with the present invention.

DETAILED DESCRIPTION OF THE INVENTION

With reference to the FIGURE, a plurality of hybrid couplers $H_{1b}$, $H_{2b}$ ... $H_{nb}$, are coupled to associated hybrid couplers $H_{1a}$, $H_{2a}$ ... $H_{na}$, via a plurality of associated bandpass filters $f_{11}$, $f_{12}$, $f_{21}$, $f_{22}$ ... $f_{n1}$, $f_{n2}$.

The hybrids and filters in accordance with the present invention are grouped in terms of n "modules" 10, 15, and 20, each of the "modules" providing a "directional filter". In module 15, for example, output port 3 of hybrid $H_{2b}$ is coupled to input port 1 of hybrid $H_{2a}$ via filter $f_{21}$, while output port 4 of hybrid $H_{2b}$ is coupled to input port 2 of hybrid $H_{2a}$ via bandpass filter $f_{22}$, identical to filter $f_{21}$. With this arrangement, a signal applied to input port 1 of hybrid $H_{2b}$ appears exclusively at output port 4 of hybrid $H_{2a}$ while a signal applied to input port 2 of hybrid $H_{2b}$ appears exclusively at output port 3 of hybrid $H_{2a}$.

Each of the hybrids used in the modules are commonly used hybrid couplers of well-known construction. The directivity of each of the hybrids should be such that the coupling between ports 1 and 2 be less than −35 dB in order to prevent excess polarization interference. Hybrid couplers having such characteristics are well known in the art.

Each of the two bandpass filters in each of the directional filter modules have a passband corresponding to the frequency band of the transmitted signal for that particular module. For example, in Intelsat IV, each of the modules would operate over a 36 MHz band plus an additional 4 MHz guard band. Filters in the same module, such as filters $f_{21}$ and $f_{22}$ in module 15, for example, should have a passband characteristic generally corresponding to the 36 MHz+4 MHz bandwidth. Furthermore, filters in the same module, such as $f_{21}$ and $f_{22}$ in module 15, should be identical in order to prevent excess polarization interference. While bandpass filters which readily lend themselves to operation in the presently disclosed system will be apparent to those skilled in the art, the filters generally disclosed in U.S. Pat. Nos. 4,060,779 or 3,969,692 may be employed in conjunction with the present invention.

The plurality of modules are interconnected as shown in the FIGURE. Specifically, output port 4 of hybrid $H_{1a}$ is connected to output port 3 of hybrid $H_{2a}$. Similarly, output port 4 of hybrid $H_{2a}$ is applied to output port 3 of the next module, and output port 3 from hybrid $H_{na}$ is coupled to output port 4 from the previous module. A pair of multiplexer outputs 25 and 30 are provided at output port 3 of hybrid $H_{1a}$ and output port 4 of hybrid $H_{na}$, respectively.

A plurality of frequency diverse signals applied to input ports 1 of each of the modules are combined and provided exclusively at output port 30 to provide a frequency multiplexed signal. Due to the symmetry of the hybrid couplers, frequency diverse signals applied to input ports 2 of each of the modules appear as frequency multiplexed signals at output port 25. Antennas 35 and 40 connected to output ports 25 and 30, respectively, provide mutually orthogonal polarizations to thereby produce frequency multiplexed, dual polarized frequency reuse signals.

Since the signals provided from each of the individual modules 10, 15 and 20 occupy a unique portion of the total frequency spectrum, the signals provided on the various output ports of the modules propagate from one module to the next until the signals arrive at either of output ports 25 or 30. More specifically, a signal at frequency $f_2$ from output port 3 of hybrid $H_{2a}$ will be applied to output port 4 of hybrid $H_{1a}$ in module 10. Since the filters $f_{11}$ and $f_{12}$, are centered at frequency $f_1$, the frequency of module 10, the signal from module 15 at $f_2$ will be completely reflected by the filters $f_{11}$ and $f_{12}$ to output port 3 of hybrid $H_{1a}$. The output ports 3 and 4 of each of the hybrids $H_{1a}, H_{2a} \ldots H_{na}$ are therefore "unity coupled" for signals having frequencies other than the associated module frequency.

Thus it is seen that the apparatus in accordance with the present invention provides a multiplexer having both frequency and polarizaton diversity and requires a minimum number of components. The number of transmitters applied to input ports 1 may be less than or equal to the number of modules, n. Similarly, the number of transmitters applied to input ports 2 of the modules may be less than or equal to the number of the modules. The number of transmitters applied to input ports 1 need not be equal to the number of transmitters applied to input ports 2.

The multiplexer in accordance with the present invention will provide isolation between the signals at ports 25 and 30 of 35 dB or better, when hybrids are employed having coupling between ports 1 and 2 of less than $-35$ dB.

While the apparatus in accordance with the present invention has been described as a transmitter, it is readily apparent that the same apparatus may be used as a dual polarization frequency demultiplexer as well. In this case, orthogonal polarizations are separated by receiving antennas 35 and 40 and applied to input ports 25 and 30. The individual modules are frequency selective and provide a pair of signals at the associated frequency at ports 1 and 2 corresponding to polarizations received at antennas 40 and 35, respectively.

Various changes, additions and omissions of elements may be made within the scope and spirit of this invention. It is to be understood that the invention is not limited to specific details, examples and preferred embodiments shown and described herein.

I claim:

1. A transmitter apparatus comprising:
a plurality of frequency selective modules each having first, second, third and fourth ports, a signal applied to said first port producing an output at said fourth port to the substantial exclusion of said third port when said signal is in a given frequency range, a signal applied to said second port producing an output at said third port to the substantial exclusion of said fourth port when said signal is in said given frequency range, said modules being connected to provide a pair of main ports, one of said pair of main ports being taken from said third port of one of said plurality of modules, the other of said pair of main ports being taken from said fourth port of one of said plurality of modules, said given frequency range of each said modules being different for different modules, wherein one of said main ports is connected to an antenna of a first polarization, and the other of said main ports is connected to an antenna of a second polarization orthogonal to said first polarization.

2. A transmitter apparatus comprising:
a plurality of frequency selective modules each having first, second, third and fourth ports, a signal applied to said first port producing an output at said fourth port to the substantial exclusion of said third port when said signal is in a given frequency range, a signal applied to said second port producing an output at said third port to the substantial exclusion of said fourth port when said signal is in said given frequency range, said modules being connected to provide a pair of main ports, one of said pair of main ports being taken from said third port of one of said plurality of modules, the other of said pair of main ports being taken from said fourth port of one of said plurality of modules, said given frequency range of each of said modules being different from different modules, wherein each of said modules comprise first and second hybrid couplers connected to each other by a pair of bandpass filters, said filters provided to pass a signal in said given frequency range, wherein one of said main ports is connected to an antenna of a first polarization, and the other of said main ports is connected to an antenna of a second polarization orthogonal to said first polarization.

3. A transmitter apparatus comprising:
a plurality of frequency selective modules each having first, second, third and fourth ports, a signal applied to said first port producing an output at said fourth port to the substantial exclusion of said third port when said signal is in a given frequency range, a signal applied to said second port producing an output at said third port to the substantial exclusion of said fourth port when said signal is in said given frequency range, said modules being connected to provide a pair of main ports, one of said pair of main ports being taken from said third port of one of said plurality of modules, the other of said pair of main ports being taken from said fourth port of one of said plurality of modules, said given frequency range of each of said modules being different for different modules, wherein each of said modules comprise first and second hybrid couplers connected to each other by a pair of bandpass filters, said filters provided to pass a signal in said given frequency range, wherein said first and second hybrid couplers are 3 dB couplers, said first hybrid coupler providing said first and second ports and a first pair of intermediate ports, said second hybrid coupler providing said third and fourth ports and a second pair of intermediate ports, said first pair of intermediate ports respectively connected to said second pair of intermediate ports via said pair of bandpass filters, wherein one of said main ports is connected to an antenna of a first polarization, and the other of said main ports is connected to an antenna of a second polarization orthogonal to said first polarization.

4. A transmitter apparatus comprising:

a plurality of frequency selective modules each having first, second, third and fourth ports, a signal applied to said first port producing an output at said fourth port to the substantial exclusion of said third port when said signal is in a given frequency range, a signal applied to said second port producing an output at said third port to the substantial exclusion of said fourth port when said signal is in said given frequency range, said modules being connected to provide a pair of main ports, one of said pair of main ports being taken from said third port of one of said plurality of modules, the other of said pair of main ports being taken from said fourth port of one of said plurality of modules, said given frequency range of each of said modules being different for different modules, wherein said third port of at least one of said modules is connected to said fourth port of a module adjacent thereto, wherein one of said main ports is connected to an antenna of a first polarization, and the other of said main ports is connected to an antenna of a second polarization orthogonal to said first polarization.

5. A transmitter apparatus comprising:

a plurality of frequency selective modules each having first, second, third and fourth ports, a signal applied to said first port producing an output at said fourth port to the substantial exclusion of said third port when said signal is in a given frequency range, a signal applied to said second port producing an output at said third port to the substantial exclusion of said fourth port when said signal is in said given frequency range, said modules being connected to provide a pair of main ports, one of said pair of main ports being taken from said third port of one of said plurality of modules, the other of said pair of main ports being taken from said fourth port of one of said plurality of modules, said given frequency range of each of said modules being different for different modules, wherein said third port of at least one of said modules is connected to said fourth port of a module adjacent thereto, wherein each of said modules comprise first and second 3 dB hybrid couplers, said first hybrid coupler providing said first and second ports and a first pair of intermediate ports, said second hybrid coupler providing said third and fourth ports and a second pair of intermediate ports, said first pair of intermediate ports respectively connected to said second pair of intermediate ports via a pair of bandpass filters, wherein one of said main ports is connected to an antenna of a first polarization, and the other of said main ports is connected to an antenna of a second polarization orthogonal to said first polarization.

6. A transmitter apparatus comprising:

a plurality of frequency selective modules each having first, second, third and fourth ports, a signal applied to said first port producing an output at said fourth port to the substantial exclusion of said third port when said signal is in a given frequency range, a signal applied to said second port producing an output at said third port to the substantial exclusion of said fourth port when said signal is in said given frequency range, said modules being connected to provide a pair of main ports, one of said pair of main ports being taken from said third port of one of said plurality of modules, the other of said pair of main ports being taken from said fourth port of one of said plurality of modules, said given frequency range of each of said modules being different for different modules, wherein said third port of at least one of said modules is connected to said fourth port of a module adjacent thereto, wherein a first signal delivered from said third port of said at least one of said modules to said fourth port of said module adjacent thereto is substantially reflected from said fourth port to said third port of said module adjacent thereto, wherein a second signal delivered from said fourth port of said module adjacent thereto to said third port of said at least one of said modules is substantially reflected from said third port to said fourth port of said at least one of said modules, wherein each of said modules comprise first and second 3 dB hybrid couplers, said first hybrid coupler providing said first and second ports and a first pair of intermediate ports, said second hybrid coupler providing said third and fourth ports and a second pair of intermediate ports, said first pair of intermediate ports respectively connected to said second pair of intermediate ports via a a pair of bandpass filters, wherein one of said main ports is connected to an antenna of a first polarization, and the other of said main ports is connected to an antenna of a second polarization orthogonal to said first polarization.

7. A receiver apparatus comprising:

a plurality of frequency selective modules each having first, second, third and fourth ports, a signal applied to said third port producing an output at said second port to the substantial exclusion of said first port when said signal is in a given frequency range, a signal applied to said fourth port producing an output at said first port to the substantial exclusion of said second port when said signal is in said given frequency range, said modules being connected to provide a pair of main ports, one of said pair of main ports being applied to said third port of one of said plurality of modules, the other of said pair of main ports being applied to said fourth port of one of said plurality of modules, said given frequency range of each of said modules being different for different modules, wherein one of said main ports is connected to an antenna of a first polarization, and the other of said main ports is connected to an antenna of a second polarization orthogonal to said first polarization.

8. A receiver apparatus comprising:

a plurality of frequency selective modules each having first, second, third and fourth ports, a signal applied to said third port producing an output at said second port to the substantial exclusion of said first port when said signal is in a given frequency range, a signal applied to said fourth port producing an output at said first port to the substantial exclusion of said second port when said signal is in said given frequency range, said modules being connected to provide a pair of main ports, one of said pair of main ports being applied to said third port of one of said plurality of modules, the other of said pair of main ports being applied to said fourth port of one of said plurality of modules, said given frequency range of each of said modules being different for different modules, wherein each of said modules comprise first and second hybrid couplers connected to each other by a pair of bandpass filters, said filters provided to pass a signal in said given frequency range, wherein one of said main ports is connected to an antenna of a first polarization, and the other of said main ports is connected to an antenna of a second polarization orthogonal to said first polarization.

9. A receiver apparatus comprising:
a plurality of frequency selective modules each having first, second, third and fourth ports, a signal applied to said third port producing an output at said second port to the substantial exclusion of said first port when said signal is in a given frequency range, a signal applied to said fourth port producing an output at said first port to the substantial exclusion of said second port when said signal is in said given frequency range, said modules being connected to provide a pair of main ports, one of said pair of main ports being applied to said third port of one of said plurality of modules, the other of said pair of main ports being applied to said fourth port of one of said plurality of modules, said given frequency range of each of said modules being different for different modules, wherein each of said modules comprise first and second hybrid couplers connected to each other by a pair of bandpass filters, said filters provided to pass a signal in said given frequency range, wherein said first and second hybrid couplers are 3 dB couplers, said first hybrid coupler providing said first and second ports and a first pair of intermediate ports, said second hybrid coupler providing said third and fourth ports and a second pair of intermediate ports, said first pair of intermediate ports respectively connected to said second pair of intermediate ports via said pair of bandpass filters, and wherein one of said main ports is connected to an antenna of a first polarization, and the other of said main ports is connected to an antenna of a second polarization orthogonal to said first polarization.

10. A receiver apparatus comprising:
a plurality of frequency selective modules each having first, second, third and fourth ports, a signal applied to said third port producing an output at said second port to the substantial exclusion of said first port when said signal is in a given frequency range, a signal applied to said fourth port producing an output at said first port to the substantial exclusion of said second port when said signal is in said given frequency range, said modules being connected to provide a pair of main ports, one of said pair of main ports being applied to said third port of one of said plurality of modules, the other of said pair of main ports being applied to said fourth port of one of said plurality of modules, said given frequency range of each of said modules being different for different modules, wherein one of said main ports is connected to an antenna of a first polarization, and the other of said main ports is connected to an antenna of a second polarization orthogonal to said first polarization, and wherein said third port of at least one of said modules is connected to said fourth port of a module adjacent thereto.

11. A receiver apparatus comprising:
a plurality of frequency selective modules each having first, second, third and fourth ports, a signal applied to said third port producing an output at said second port to the substantial exclusion of said first port when said signal is in a given frequency range, a signal applied to said fourth port producing an output at said first port to the substantial exclusion of said second port when said signal is in said given frequency range, said modules being connected to provide a pair of main ports, one of said pair of main ports being applied to said third port of one of said plurality of modules, the other of said pair of main ports being applied to said fourth port of one of said plurality of modules, said given frequency range of each of said modules being different for different modules, wherein said third port of at least one of said modules is connected to said fourth port of a module adjacent thereto, wherein each of said modules comprise first and second 3 dB hybrid couplers, said first hybrid coupler providing said first and second ports and a first pair of intermediate ports, said second hybrid coupler providing said third and fourth ports and a second pair of intermediate ports, said first pair of intermediate ports respectively connected to said second pair of intermediate ports via a pair of bandpass filters, and wherein one of said main ports is connected to an antenna of a first polarization, and the other of said main ports is connected to an antenna of a second polarization orthogonal to said first polarization.

12. A receiver apparatus comprising:
a plurality of frequency selective modules each having first, second, third and fourth ports, a signal applied to said third port producing an output at said second port to the substantial exclusion of said first port when said signal is in a given frequency range, a signal applied to said fourth port producing an output at said first port to be substantial exclusion of said second port when said signal is in said given frequency range, said modules being connected to provide a pair of main ports, one of said pair of main ports being applied to said third port of one of said plurality of modules, the other of said pair of main ports being applied to said fourth port of one of said plurality of modules, said given frequency range of each of said modules being different for different modules, wherein said third port of at least one of said modules is connected to said fourth port of a module adjacent thereto, wherein a first signal delivered from said third port of said at least one of said modules to said fourth port of said module adjacent thereto is substantially reflected from said fourth port to said third port of said module adjacent thereto, wherein a second signal delivered from said fourth port of said module adjacent thereto to said third port of said at least one of said modules is substantially reflected from said third port to said fourth port of said at least one of said modules, wherein each of said modules comprise first and second 3 dB hybrid couplers, said first hybrid coupler providing said first and second ports and a first pair of intermediate ports, said second hybrid coupler providing said third and fourth ports and a second pair of intermediate ports, said first pair of intermediate ports respectively connected to said second pair of intermediate ports via a pair of bandpass filters, and wherein one of said main ports is connected to an antenna of a first polarization, and the other of said main ports is connected to an antenna of a second polarization orthogonal to said first polarization.

13. The apparatus of claim 2 or 8 wherein the third port of at least one of said modules is connected to the fourth port of a module adjacent thereto.

* * * * *